Patented May 15, 1934

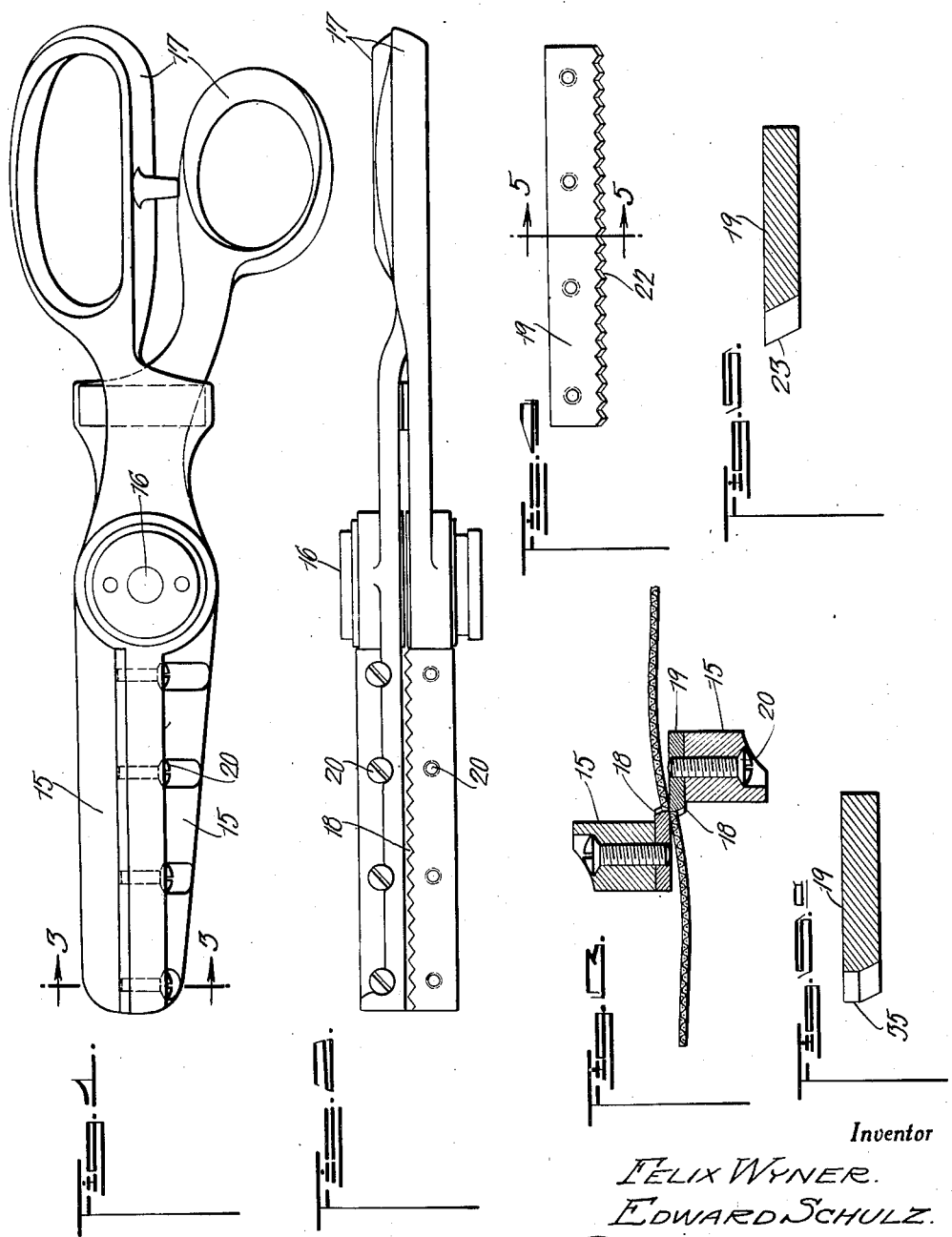

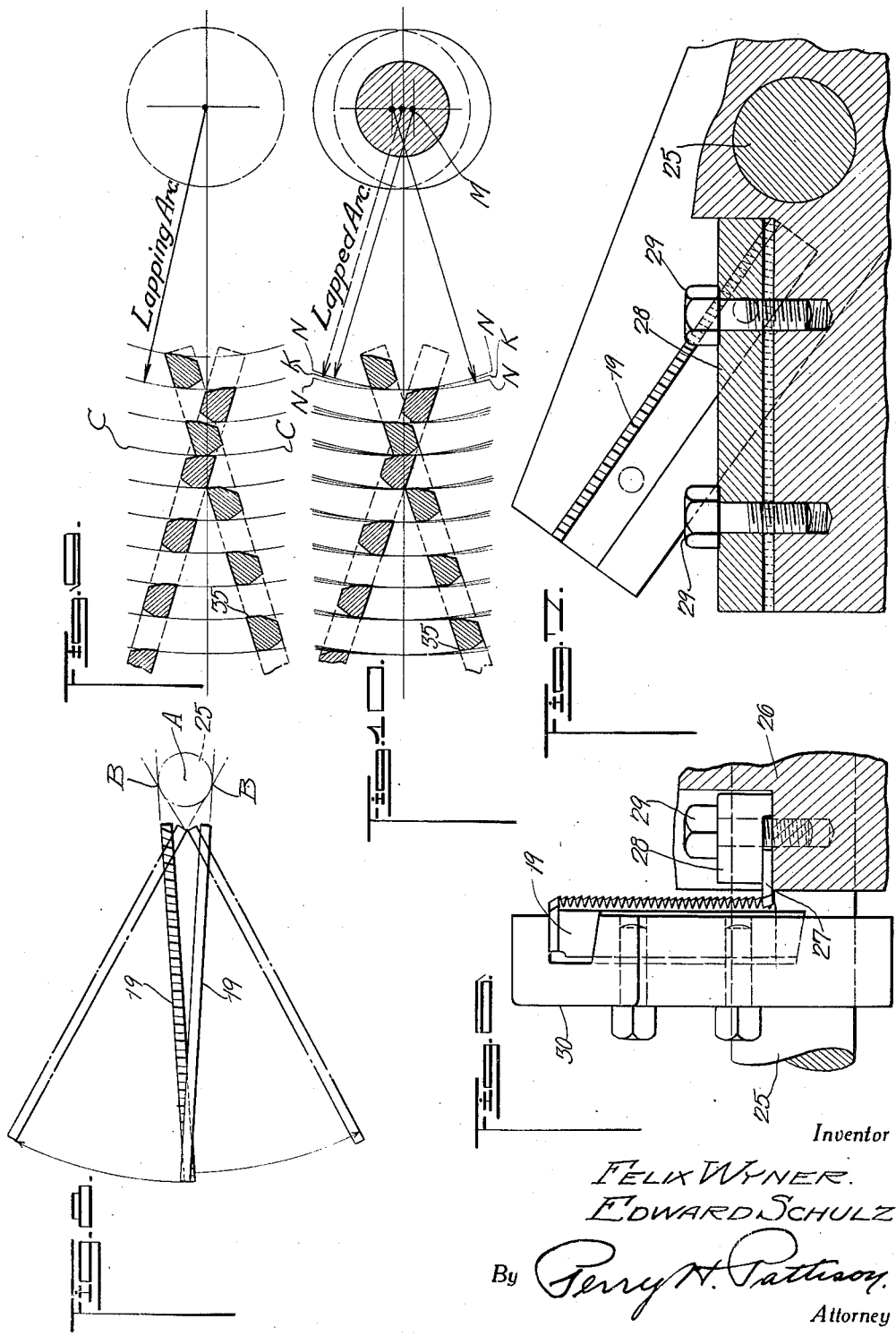

1,959,190

UNITED STATES PATENT OFFICE 1,959,190

METHOD OF MAKING PINKING SHEARS

Felix Wyner, New York, and Edward Schulz, Flushing, N. Y., assignors to Samuel Briskman, New York, N. Y.

Application March 17, 1932, Serial No. 599,452

13 Claims. (Cl. 76—104)

This invention relates to a new and novel method of forming pinking shears, one type of which is described in the pending application of Felix Wyner and Edward Schulz, filed February 5, 1931, Serial Number 513,734, of which this application is a continuation in part.

It is an object of the present invention to facilitate and expedite the manufacture of pinking shears and while a pair of shears of the type disclosed in the above mentioned Wyner and Schulz application is employed to herein illustrate the improved method, the same may be employed in the manufacture of other types of pinking shears as well, such for example as those illustrated in an application filed by one, Curtis Weidauer, September 19, 1931, Serial Number 563,829.

In the accompanying drawings which form a part of this application:

Figure 1 is a view in side elevation of a pair of pinking shears,

Figure 2 is a plan view thereof taken at right angles to Figure 1,

Figure 3 is a transverse sectional view taken on the line 3—3 of Figure 1,

Figure 4 is a plan view of a cutting element formed in accordance with the hereinafter described method, Figure 5 is a transverse sectional view taken on the line 5—5 of Figure 4, said view being taken on an enlarged scale, Figure 5A is a view similar to Figure 5 illustrating an advanced step of the method, Figure 6 is a view partly in section and partly in elevation illustrating a fixture by which one step of the improved method is carried out, Figure 7 is a view partly in section and partly in elevation taken at right angles to Figure 6, Figure 8 is a diagrammatic view illustrating another step in the method, Figure 9 is an enlarged sectional view illustrating more in detail that step of the method illustrated in Figure 8, and;

Figure 10 is a diagrammatic view illustrating the manner in which the finished product operates.

One type of pinking shears constructed in accordance with the method herein illustrated consists of jaw members 15 pivotally connected together as at 16 and having operating handles 17. The jaws 15 are provided with serrated shearing or cutting edges 18 which are herein illustrated as separate blade elements 19 removably attached as by screws, bolts or similar fastenings 20 to the jaws 15 but which may also be formed integrally with the jaws as illustrated in the aforementioned Weidauer application.

The serrated shearing edges are complementary and to the attainment of the best results in their manufacture, they are constructed in pairs. These serrated shearing edges are also undercut and the undercut portions thereof are separated or spaced from the shearing edge proper by curved faces struck on an arc.

As specifically described in a pending application of Felix Wyner and Edward Schulz, Serial Number 513,734 the cutting edges move during operation through an arc which does not coincide with, or which is eccentric with respect to the arc on which these curved faces are struck in their formation in order to provide an infinitesimal shearing contact and immediately clearing shearing edges.

In that type of shears illustrated in the accompanying drawings, the cutting edges are formed upon the side edges of cutting elements 19 and said cutting edges are of "zig-zag" formation as indicated at 22 although they may be of other types of irregular edge. The serrated edge 22 is formed by a suitable milling operation and is undercut as indicated by the reference character 23. After the cutting elements 19 have been so formed, they are placed in a shearing fixture such as illustrated in Figures 6 and 7 of the drawings. This shearing fixture comprises a shaft 25 and a stationary member 26. The stationary member 26 carries a hardened shearing blade 27 which may be held in position by a clamp 28, fastened down by means of cap screws, bolts, or similar fastenings 29. A movable member 30 is mounted upon the shaft 25 and this member carries the cutting element 19 to be sheared as illustrated in Figures 6 and 7 and the longitudinal axis of the cutting element carried by the movable member is off-set or non-radial with respect to the axis of the movable member as is also the longitudinal axis of the stationary member 26. The shearing operation is performed by moving the member 30 relative to the member 26 and causing the serrated edge of the cutting element 19 to engage the serrated edge of the blade 27. This action removes a portion of the serrated edge of the blade 19 and forms on each side of each serration a curved face 35. A transverse sectional view of a cutting element thus far completed is illustrated in Figure 5A of the drawings.

The cutting elements are formed preferably from material of relatively low temper in order to facilitate the milling and shearing operations and after they are thus far formed and before lapping, they preferably are tempered to the desired degree of hardness.

After the cutting elements have been sheared as above described, they are lapped together in order that the curved or arced faces 35 thereof which are formed by the shearing operation may be made complementary in pairs, that is to say that the cutting elements will be paired and from this step on will be worked together as a pair in order that complementary shearing edges will result.

As will be noted by reference to Figure 7, the longitudinal axis of the cutting element 19 which is being sheared and the longitudinal axis of the shearing blade 27 do not extend through the axis of the shaft 25 but instead, are slightly offset with respect to the axis of the said shaft 25 and pass to opposite sides thereof if continued therebeyond. This relative position of the longitudinal axes of the cutting elements 19 and the shearing blade 27 with respect to the axis of the shaft 25 while it produces curved or arcuate faces 35 which are concentric with the arc of movement of the pivoted member 30 of the shearing fixture, these faces are not concentric with the working axis of the shear jaws on which the cutting elements are mounted for operation as will be explained. This offset is relatively small, but is done for the purpose of providing curved or arcuate faces 35 which will be slightly eccentric with respect to each other on opposite cutting elements and to the working axis about which the jaws upon which the serrated shearing blades are mounted operate in the finished product.

After the curved or arcuate faces 35 have been formed as heretofore described by shearing, they are finished off by what is known as a lapping operation. A suitable lapping fixture not herein illustrated is employed and in this fixture, there is a stationary blade holding member and a movable blade holding member. A blade or cutting element 19 is mounted in each of these holding members and the movable blade carrying member is rocked about its pivotal point in order to move the cutting element carried thereby into wiping engagement with the stationary cutting element throughout the entire length of the serrated edges of the two cutting elements in order to lap the curved faces 35 into complementary formation. The cutting elements are so mounted in this lapping fixture that their longitudinal axes are offset with respect to the axis about which the movable member of the lapping fixture operates and the extent to which these cutting elements are offset in the lapping fixture corresponds to the degree of offset employed during the shearing operation.

The lapping operation heretofore described is diagrammatically illustrated in Figures 8 and 9, and by reference to said figures it will be noted that the cutting elements 19 are so positioned that their longitudinal axes pass on opposite sides of the axis A of the shaft 25 as indicated by the reference character B in Figure 8, and as illustrated in Figure 9, the arcuate path of travel of the curved faces 35 is indicated by the curved line C, this illustration, however, being on a greatly exaggerated scale. As heretofore stated, the amount of off-set during the lapping operation is indicated by distance between A and B in Figure 8, and is the same as employed during the shearing operation.

As fully explained in the aforementioned Wyner and Schulz application, these cutting elements are off-set with relation to the pivotal axis of the jaws of the shears and this degree of offset is increased or is greater than the degree of offset employed during the shearing and lapping operations.

In Figure 10 is illustrated diagrammatically the two paths of travel of the curved or arcuate faces 35. Referring to this figure it will be noted that there is a curved line designated K and this curved line indicates the arc upon which the curved or arcuate faces 35 are formed. In mounting these cutting elements upon the shear jaws, however, they are still further offset as heretofore stated and as indicated at M in said figure and the arc of travel of the arcuate faces 35 when so mounted is indicated by the curved line N in said Figure 10.

The extent of this additional off-setting is not in all cases uniform but in any event it is slight compared with the off-setting which exists when the cutting elements are being lapped or both sheared and lapped. In shears which we have produced exactly the same as herein illustrated the off-set which the shearing elements had during the lapping or both shearing and lapping operations was about one quarter, (¼) of one inch from the center of rotation during these operations whereas in the finished shears each shearing element is off-set an additional amount equal to approximately one sixty fourth (1/64) of one inch. It will be understood, that the two shearing elements will be each off-set the same amount but in opposite directions from the operating center of the shears.

From the foregoing, it will be apparent that the foregoing described method provides for the practical manufacture of pinking shears of the type described in the Wyner and Schulz and Weidauer pending applications heretofore mentioned.

The shearing operation herein described is not an essential step in the method since it may be eliminated and the curved or arcuate faces 35 formed solely by the lapping operation. It has been found in practice, however, that the lapping operation is slow and tedious and when practiced without the shearing operation materially increases the time necessary to complete a pair of cutting elements and the shearing operation is therefore resorted to in order to expedite the method.

While the invention has been herein illustrated in a preferred form, it is to be understood that the invention is not to be limited to the specific construction or details herein illustrated, and that it may be practiced in other forms without departing from the spirit thereof.

Having thus described the invention, what is claimed as new and what it is desired to secure by Letters Patent of the United States, is;

1. The method of making pinking shears which comprises forming serrations on a pair of blades, lapping the serrated portions of the blades by moving the blades relatively while in pivoted relation, the serrations of each blade being offset during the lapping operation from a line radially extending from the pivotal axis and then permanently mounting the blades in pivoted relation with the serrations differently offset than in the lapping operation.

2. The method of making pinking shears which comprises forming serrations on two shearing blades, and forming curved surfaces on the sides of the serrations by both shearing and lapping operations, both the shearing and lapping operations being performed about a center with the serrations offset from the center the same amount during both operations.

3. The method of making a pinking shear blade which comprises forming serrations on the blade and then removing a portion of said serrations, the operation of removing said portion of the serrations being performed about a center with the serrations offset from the center a predetermined distance to form curved surfaces on the sides of the serrations having arcs eccentric with respect to the axis of the center.

4. The method of making a pinking shear blade which comprises forming serrations on the blades and then subjecting the serrations to a shearing operation, said shearing operation being performed about a center with the longitudinal axis of the blade extending non-radially with respect to the center to form curved surfaces on a portion of the serrations defining arcs eccentric with respect to the axis of the center.

5. The method of making a pinking shear blade which comprises forming undercut serrations on the blade and subsequently removing the outermost portions of the undercut, the removal of said outermost portion being performed about a center with the serrations offset from the center a predetermined distance to form curved faces on said removed portion having arcs eccentric with respect to the axis of the center.

6. The method of making pinking shear blades which comprises undercutting the blades to form serrations thereon and subsequently shearing the outermost edge of the undercut portion, said shearing operation being carried out by means of a shearing die mounted in pivoted shearing relation to the blade, said die and blade having their longitudinal axes disposed non-radially at opposite sides of the axis of the pivot to produce curved sheared portions eccentric with respect to the axis of the pivot.

7. The method of making pinking shear blades which comprises undercutting the blades to form serrations thereon and subsequently shearing the outermost edge of the undercut portion, said shearing operation being carried out by means of a shearing die mounted in pivoted shearing relation to the blade, said die and blade having their longitudinal axes disposed non-radially with respect to the axis of the pivot to produce curved sheared portions eccentric with respect to the axis of the pivot.

8. The method of producing pinking shears which comprises forming undercut shearing teeth on a pair of shearing blades and subsequently removing portions of the undercut sides of the teeth to form complementary curved faces thereon, said removal operation being carried out with reference to a pivotal mounting for the blades whereby said curved faces define arcs eccentric with respect to the axis of said pivot.

9. The method of producing pinking shears which comprises undercutting the blade of the shears to form serrations thereon and subsequently shearing a portion of each serration, the shearing operation being carried out by disposing a shearing die in pivoted shearing relation with respect to the serrated blade and arranging the blade and the die with their longitudinal axes disposed non-radially at opposite sides of the axis of the pivot to produce a curved sheared portion on each serration.

10. The method of producing pinking shears which comprises undercutting the blade of the shears to form serrations thereon and subsequently shearing a portion of each serration, the shearing operation being carried out by disposing a shearing die in pivoted shearing relation with respect to the serrated blade and arranging the blade and the die with their longitudinal axes disposed non-radially with respect to the axis of the pivot to produce a curved sheared portion on each serration.

11. The method of making pinking shears which comprises forming undercut shearing teeth on a pair of shearing blades, subsequently removing portions of the undercut edges of the teeth to form complementary curved faces thereon and subjecting the pair of blades to a matching operation prior to the permanent mounting thereof, said matching operation being carried out by lapping the curved faces of the respective blades with reference to a pivotal mounting for the blades whereby said curved faces define arcs eccentric with respect to the axis of the pivot.

12. The method of making pinking shears which comprises forming undercut shearing teeth on a pair of shearing blades, subsequently removing portions of the undercut edges of the teeth to form complementary curved faces thereon and subjecting the pair of blades to a matching operation prior to the permanent mounting thereof, said matching operation being carried out by lapping the curved faces of the respective blades with reference to a pivotal mounting for the blades, said blades having their longitudinal axes disposed non-radially at opposite sides of the axis of the pivot to position the curved faces of the blades eccentrically with respect to each other and with respect to the axis of the pivot.

13. The method of making pinking shears which comprises forming undercut shearing teeth on a pair of shearing blades, subsequently removing portions of the undercut edges of the teeth to form complementary curved faces thereon and subjecting the pair of blades to a matching operation prior to the permanent mounting thereof, said matching operation being carried out by lapping the curved faces of the respective blades with reference to a pivotal mounting for the blades whereby the blades are positioned with their curved faces in cooperative cutting relation and define arcs eccentric with respect to the axis of the pivot.

FELIX WYNER.
EDWARD SCHULZ.